Sept. 25, 1962 T. H. BRAUN ETAL 3,055,261
OPTICAL APPARATUS FOR CURVE COMPARISON
Filed Jan. 21, 1959 7 Sheets-Sheet 2

INVENTORS
THEODOR H. BRAUN
RUSSELL T. GEROW
BY
ATTORNEY

INVENTORS
THEODOR H. BRAUM
RUSSELL T. GEROW
BY
ATTORNEY

INVENTORS
THEODOR H. BRAUN
RUSSELL T. GEROW
BY
ATTORNEY

Sept. 25, 1962 T. H. BRAUN ETAL 3,055,261
OPTICAL APPARATUS FOR CURVE COMPARISON
Filed Jan. 21, 1959 7 Sheets-Sheet 5

INVENTORS
THEODOR H. BRAUN
RUSSELL T. GEROW
BY
ATTORNEY

# 3,055,261
Patented Sept. 25, 1962

3,055,261
OPTICAL APPARATUS FOR CURVE COMPARISON
Theodor H. Braun, Altadena, and Russell T. Gerow, Pasadena, Calif., assignors to The Superior Oil Company, Los Angeles, Calif., a corporation of California
Filed Jan. 21, 1959, Ser. No. 788,194
8 Claims. (Cl. 88—14)

This invention relates to optical comparators, and more particularly to means for comparing superimposed images of two similar curves.

Although the optical comparator of the invention may be used to compare any two visible objects, it has been found especially useful in the comparison of two curves to a third, all of which are recorded with ink on a single sheet of paper as the resistance between three corresponding pairs of electrodes spaced 120 degrees around the circumference of an oil well tool that is lowered into a well to measure the surface resistance of the well bore. The electrodes of each pair are generally spaced one or two inches vertically apart. Each resistance curve, "log" or "microlog," is recorded versus well depth. The curves are all very much alike in their shapes; however, they often are displaced along the depth abscissa of the log from one another. This is true because, although a stratum intersecting the well bore generally has approximately the same resistance from its upper to its lower surface throughout its extent, strata often will intersect the well bore at an angle with respect to the horizontal and, therefore, will intersect the well at different depths around its internal surface. This explains why the three recorded micrologs may be similar in shape but only at different depths. For this reason, it is possible to measure the relative depth displacements of two micrologs with respect to that of the third, and from the depth displacements calculate the angle of inclination and direction of inclination of strata intersecting a well bore. The angle of inclination is known in the art as the dip angle, and the direction of inclination is known simply as the strike or azimuth.

The present invention is not concerned with the method of or apparatus for recording micrologs or with calculating the dip angle and strike of strata from measured depth displacements of the logs. The curve comparator of the invention is only concerned with apparatus for comparing two of the logs with the third to measure the depth displacements.

Curve comparators are not unknown in the prior art. However, to the present time they have all required a large number of complicated component parts. For this reason, they are both large in size and expensive. They are also difficult and time-consuming to use because it has been necessary to refocus the lens system which they employ each time a different portion of one curve is compared with another.

The present invention overcomes the above-described and other disadvantages of the prior art by providing apparatus for comparing portions of at least first and second curves at various different positions along their lengths when the curves are recorded in a single predetermined plane. This plane, of course, will be the plane of the single sheet of paper on which the micrologs are recorded. The apparatus of the invention accordingly may include support means, first and second sets of first, second and third reflecting means on said support means, the first means of the first set providing a surface disposed at a 45 degree angle with respect to the predetermined plane to reflect a first image of a portion of the first curve in a first predetermined direction parallel to the lengths of the curves, said second means of the first set providing a second surface disposed at a 45 degree angle with respect to the predetermined plane to reflect a second image of the first image in a second predetermined direction perpendicular to and away from the predetermined plane; the third means of the first set providing a third surface disposed at an angle of 45 degrees with respect to the predetermined plane to reflect a third image of the second image in a third predetermined direction parallel to but opposite the first predetermined direction; a lens system on the support means; a beam splitter on the support means disposed in a position perpendicular to said predetermined plane at a 45 degree angle with respect to the lengths of the curves to direct light reflected from the third means to the lens system; the first means of the second set providing a fourth surface in a plane parallel to that of the first surface to reflect a first image of at least a portion of the second curve in the first predetermined direction; the second means of the second set providing a fifth surface in a plane parallel to that of the second surface to reflect a second image of the first image of said second curve in the second predetermined direction; the third means of the second set providing a sixth surface in a plane parallel to that of the third surface to reflect a third image of the second image of said second curve in the third predetermined direction; and fourth means on the support means for providing a seventh surface in a plane parallel to that of the beam splitter to reflect a fourth image of the third image of said second curve thereon in a direction parallel to the predetermined plane and perpendicular to the third predetermined direction, at least one of the first means of one of said sets being movable on the support means in the first predetermined direction, the optical distance from the first curve to the lens system being equal to that from the second curve to the lens system for a predetermined setting of the first means of the one set, the second and third means of the one set also being movable on the support means in the same direction as and with the first means of the one set and at one-half the speed thereof whereby the distance from a curve corresponding to the one set to said lens system is always maintained constant for any setting of the first means of the one set.

For use in this disclosure including but not limited to its use in the appended claims, the term "image" is hereby defined as both light or illumination originally emanating from a portion of a curve and that reflected from one mirror to another.

In the operation of the curve comparator of the invention, an image of one curve is reflected from the beam splitter at the same time the image of the other is transmitted therethrough. Thus, both images may be visible simultaneously adjacent one another. This means that the movable set of reflecting means, i.e., mirrors, prisms or the like, may be moved until both images approximately coincide. The support means, which may be simply a housing, and the movable set of reflecting means may both be provided with calibrated indicia from which the above-mentioned depth displacements may be read directly when images of the microlog curves are made to coincide.

Thus, the invention requires the use of only a few simple mirrors, a beam splitter and a lens system. For this reason, it is smaller in size and less expensive than curve comparators of the prior art. Still further, it may be operated rapidly without refocusing it as required by prior art comparators because the optical path from either one of two curves to the lens system always is maintained constant in accordance with the invention.

According to a special feature of the invention, the lens system is disposed in a position with its axis in line with the third reflecting means of the first set. This means that the curve comparator of the invention is unusually compact in size because the lens system extends in the same direction as the first means of each of the sets.

Still further, it is also an unusually useful feature of the invention that three sets of reflecting means are employed with one of them being selectively adjustable, whereby alternatively a first curve may be compared with a second or with a third.

The invention will be better understood when considered in connection with the following description.

In the accompanying drawings, which are to be regarded as merely illustrative:

Figure 1:
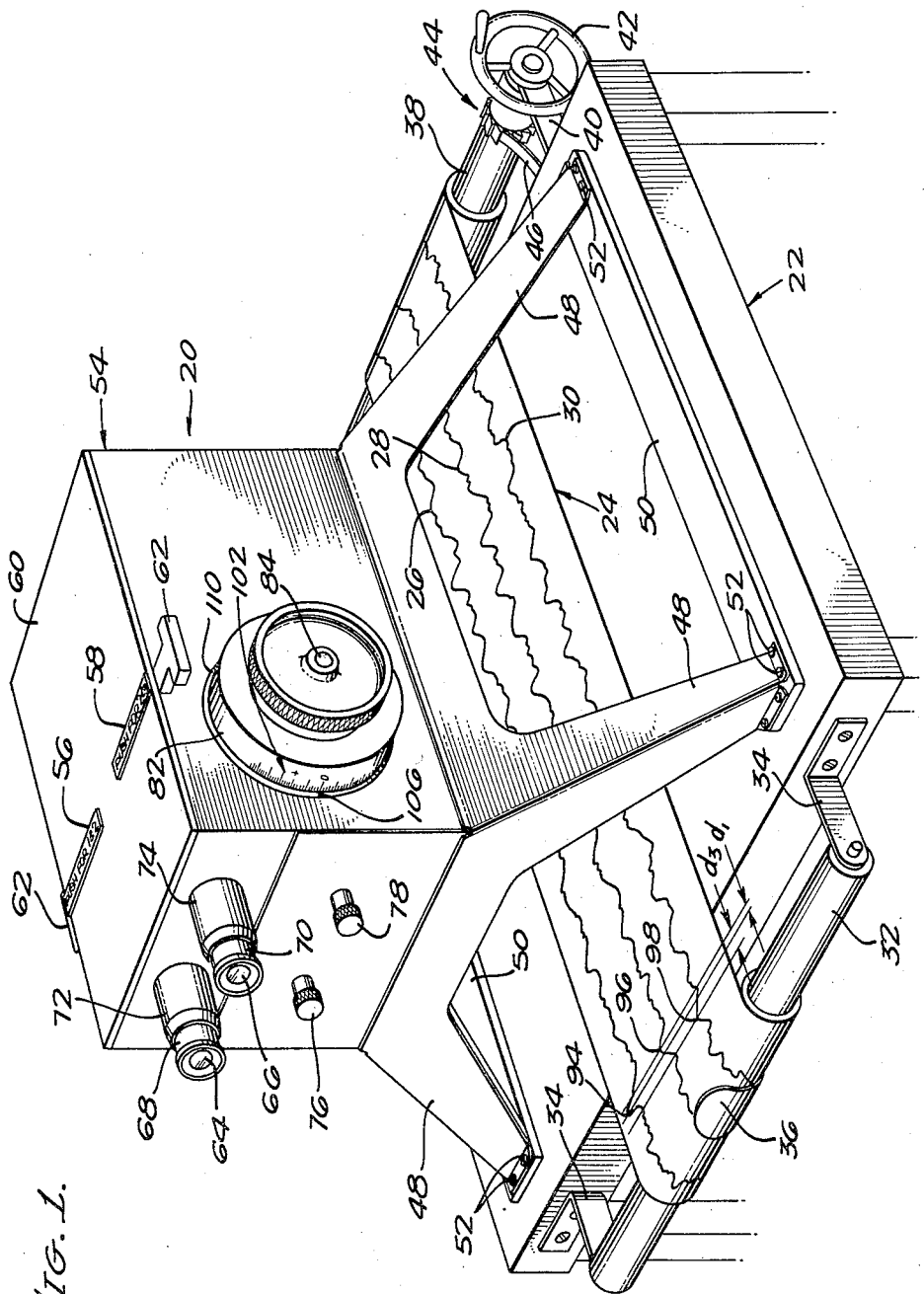
FIG. 1 is a perspective view of the curve comparator of the invention shown mounted for use.

In FIG. 1, the comparator of the invention is indicated at 20 mounted on a table 22 to support a strip of recording sheet 24 having first, second and third resistance logs 26, 28 and 30 recorded in ink thereon. Sheet 24 is wrapped around a roller 32 that is rotatably mounted in brackets 34 on table 22.

A leaf spring 36 is mounted from the bottom of the table to extend around the outer surface of paper 24 on roller 32 to hold it tight as it is wound on a second roller 38 on the opposite side of table 22 rotatably mounted in brackets 40, only one being shown in the view taken of FIG. 1. Sheet 24 is drawn tight on table 22 by rotation of roller 38 around which sheet 24 is also wrapped. Roller 38 is turned by means of a hand wheel 42. Sheet 24 is kept reasonably tight against table 22 by means of a ratchet assembly 44 on roll 38 having a leaf-spring type pall 46 fixed to table 22.

Comparator 20 is provided with a base including a set of legs 48 and base members 50, fixed to table 22 by means of bolts 52. Comparator 20 also includes housing 54 for the operating mechanism thereof.

Computations for the angle and direction of inclination of strata, called the angle of inclination of the "bedding" plane are rather complicated. For this reason, it is desirable to make apparatus for both measuring and computing this angle and the direction of inclination as simply, as reliably and as rapidly as possible and also in a manner such that a highly skilled operator is not required. For this reason, also, directions are printed on plates 56 and 58 fixed to the top 60 of housing 54. The indicia on plate 56 reads: "Push for 1 and 2," which means that a bar shown at 62 which extends completely through housing 54 should be pushed to the right as viewed from the front to compare first and second curves 26 and 28. Indicia on plate 56 reads: "Push for 2 and 3," which means that bar 62 should be pushed to the left as viewed from the front to compare curves 28 and 30. Thus, it can be seen that curve 28 is used as a reference curve.

Comparison of curves 26 and 28, and 28 and 30, is made by looking through one of two corresponding lens systems individually, although not necessarily at the same time. The total lens systems are not shown in FIG. 1 due to the view taken, only one lens, 64 and 66, of each set being shown in FIG. 1 mounted in corresponding cylinders 68 and 70, which are telescoped into members 72 and 74 through housing 54. Corresponding knurled knobs 76 and 78 are rotatably mounted in housing 54 to permit rotational adjustment of a center mirror reflecting the image of second curve 28 so that it may be more nearly placed in visual correspondence or overlapping relation with an image of curve 26 or curve 30. As stated previously, the two sets of lens systems are used alternately. The operator looks through lens 64 when first and second curves 26 and 28 are to be compared. As stated previously, curves 26 and 28 are compared when bar 62 is pushed to the right. Bar 62 is then pushed to the left and the operator looks through the lens 66 to compare the second and third curves 28 and 30.

Figure 2:
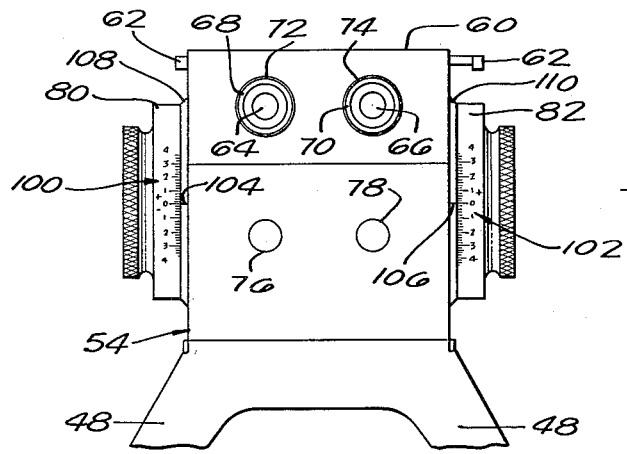
FIG. 2 is a broken front elevational view of the comparator of the invention.
Figure 3:
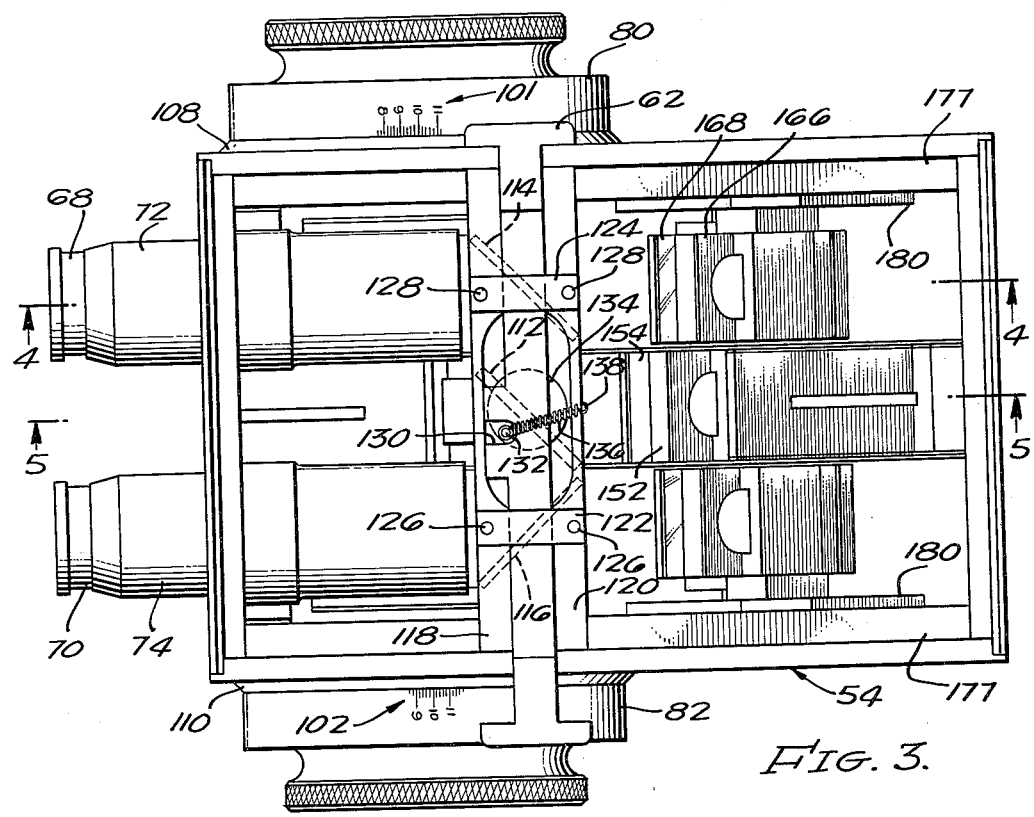
FIG. 3 is a plan view of the comparator with the top of the housing thereof taken off.
Figure 6:
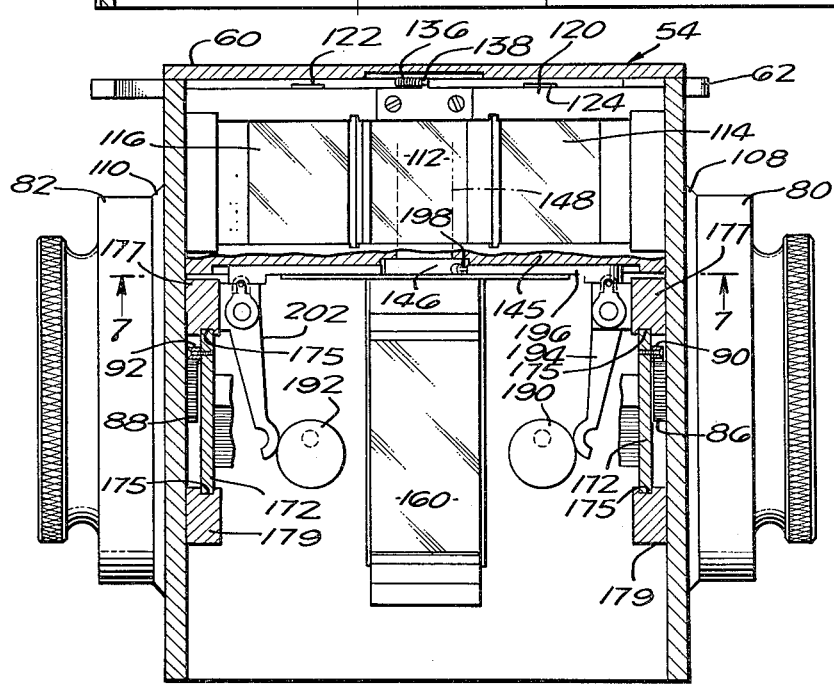
FIG. 6 is a vertical sectional view of the comparator illustrating lateral adjustment for a central mirror.

Drums 80 and 82 are rotated alternately depending upon the position of bar 62 to match the longitudinal position of first and second curves 26 and 28, or second and third curves 28 and 30. Movement of drum 80, as shown in FIGS. 2, 3 and 6, causes movement of a lefthand set of mirrors longitudinally to reflect an image of different portions of first curve 26. In this case, bar 62 is in a position shown in FIG. 1. When it is in the extreme lefthand position, drum 82 may be rotated to effectively sample portion of third curve 30 at different points along its length to match with a portion of second curve 28. Both drums 80 and 82 are fixed to individual shafts 84, only one of which is shown in FIG. 1, both of which are fixed to pinions 86 and 88 as shown in FIG. 6 which mesh with racks 90 and 92 to move sets of mirrors longitudinally corresponding, respectively, to those for reflecting an image of first curve 26 and third curve 30. The manner in which these sets of mirrors are moved will be explained in detail hereinafter.

The ultimate object in using the comparator 20 is to "match up" the shapes of portions first and second curves 26 and 28, and second and third curves 28 and 30, to determine the difference in position or "phase" displacement relative to each other. For example, it is to be noted that the first curve 26 reaches a peak at a point 94, whereas the second curve reaches a corresponding peak at a different point 96 along the length of recording sheet 24, and the third curve 30 reaches a still different point 98. Thus, it is desired to measure the distances $d_3$ and $d_1$ as indicated in FIG. 1 and other corresponding distances at several points along the recording sheet 24.

Indicia 100 and 102 are provided on drums 80 and 82 as shown in FIG. 2, which may be calibrated directly, for example, in feet or inches. $d_3$ and $d_1$ therefore may be positive or negative depending, in terms of depth, whether one curve is below or above the other. Fiducial marks 104 and 106 are provided on discs 108 and 110, affixed to the side of housing 54, for comparison with indicia 101 and 102 on drums 80 and 82.

As stated previously, bar 62 must be moved from its lefthand position to its righthand position, or vice versa, depending upon which of the first and third curves 26 and 30 is to be compared with second curve 28. Movement of bar 62 rotates a mirror indicated at 112 in FIG. 3 to a position 90 degrees with respect thereto in the position shown by dotted lines in FIG. 3. Mirror 112 reflects an image thereon to a beam splitter 114, the image of which is reflected towards lens 64. Movement of bar 62 upwardly as viewed in FIG. 3 rotates mirror 112 clockwise to reflect an image of second curve 28 to a beam splitter 116, which then reflects the same image towards lens 66. Bar 62 is supported between guide members 118 and 120 fixed to housing 54, bar 62 being held vertically between guide members 118 and 120 by means of straps 122 and 124 fixed to guide members 118 and 120 by rivets 126 and 128. Bar 62 is provided with a slot 130 near its center to receive a lug 132 fixed to a disc 134, which in turn is fixed to mirror 112. Lug 132 projects above bar 62 and has a spring 136 attached to it which is attached to lug 138 fixed to guide member 120. Thus, spring 136 acts as a toggle spring to maintain mirror 112 in the position shown in FIG. 3 or in a position 90 degrees therefrom to the right. Although they are not shown in FIG. 3, straps 122 and 124 may be provided on opposite sides of guide members 118 and 120 to hold bar 62 in place.

Figure 5:
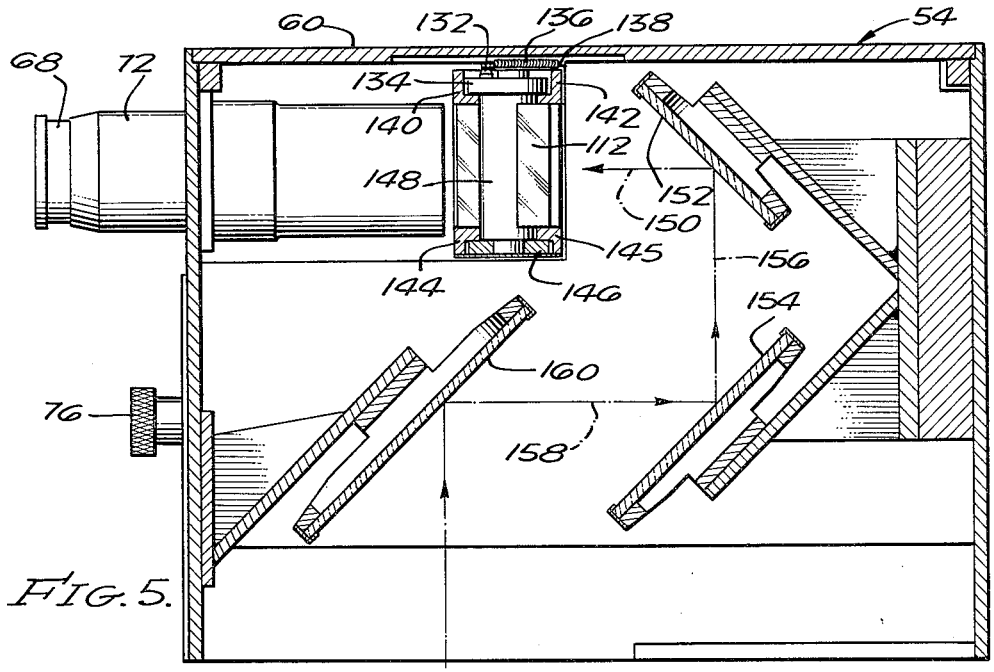
FIG. 5 is another sectional view of the comparator taken on the line 5—5 shown in FIG. 3.

As shown in FIG. 5, four guide members 140, 142, 144 and 146 support a shaft 148 centrally therein which is fixed to plate 134 and a lower plate 146, plate 134 being fixed to mirror 112 via shaft 148. An image of second curve 28 is reflected toward mirror 112 on a line 150 from a mirror 152. A second image of second curve 28 is reflected toward mirror 152 by means of a mirror 154 on a line 156. A first image of second curve 28 is reflected toward mirror 154 on a line 158 by a mirror 160. It is to be noted that mirrors 160, 154 and 152 are fixed to housing 54. It is to be noted that mirrors 160, 154 and 152 are centrally located within the housing 54. Only the back of rotatable mirror 112 is shown because of the view taken in FIG. 5.

Figure 4:
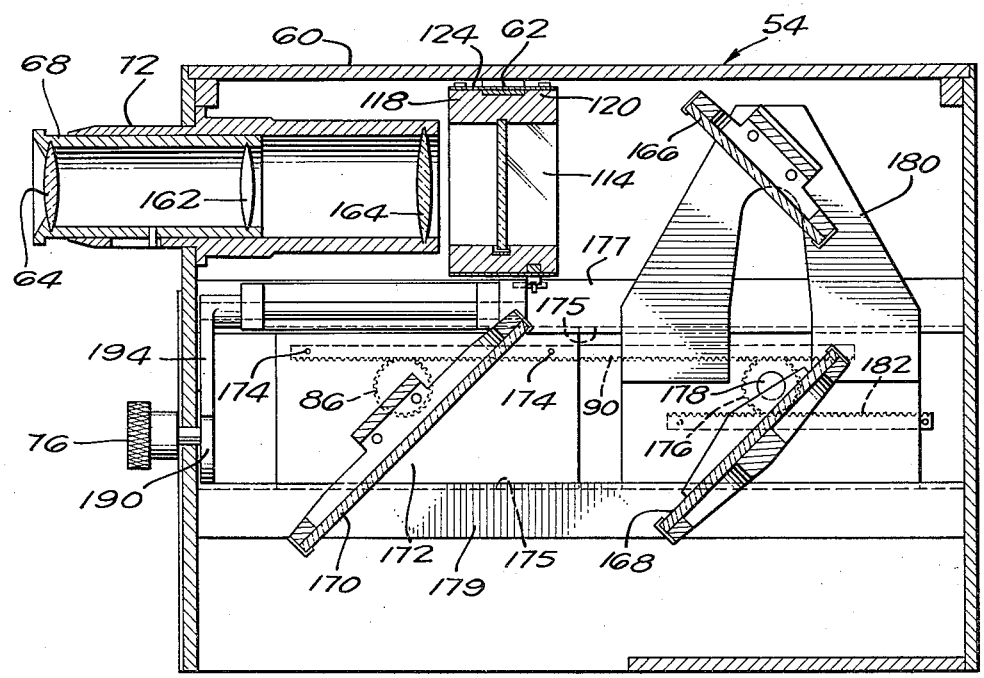
FIG. 4 is a sectional view of the comparator taken on the line 4—4 shown in FIG. 3.

As shown in FIG. 4, the section taken on the line 4—4 shown in FIG. 3 and illustrated in FIG. 4 through lens 64, would be a mirror image of that through the lens 66 taken in the opposite direction. As shown in FIG. 4, the lens system for comparison of two curves in accordance with the invention includes two lenses 162 and 164 besides lens 64. An image of two curves is directed through lenses 64, 162 and 164 by means of beam splitter 114 which transmits an image of first curve 26 which is reflected thereto by mirror 166, and reflects an image of second curve 28 an image of which is reflected thereon by means of mirror 112 in its position shown in FIG. 3. A second image of first curve 26 is reflected onto mirror 166 by mirror 168. A first image of first curve 26 is reflected onto mirror 168 by means of mirror 170. Mirrors 166, 168 and 170 function in substantially the same manner as fixed mirrors 152, 154 and 160, with the exception of the fact that mirrors 166, 168 and 170 are movable.

As stated previously, in order not to have to refocus the lens system, it is desirable to keep the optical path constant. This is done by an unusually useful and simple mechanism including gear 86 fixed to drum 80 which meshes with rack 90. Rack 90 is fixed to a plate 172 that is slidable in slots 175 provided between the walls of housing 54 and upper and lower notched strips 177 and 179. Rack 90 also meshes with pinion 176 that is rotatably mounted on a shaft 178 that is fixed to a trapezoidal shaped plate 180, to which mirrors 166 and 168 are both fixed. Pinion 176 also meshes with a rack 182 which is fixed to housing 54. Mirror 170 is fixed to plate 172. It is thus easily seen that as drum 80 is rotated and gear 86 turns, mirror 170 is moved longitudinally at twice the speed of plate 180 and therefore mirrors 166 and 168 fixed thereto. This is true because pinions 176 and 86 are the same in diameter and are identical gears. Plate 180 is also slidable in slots provided on strip 179.

Figure 7:
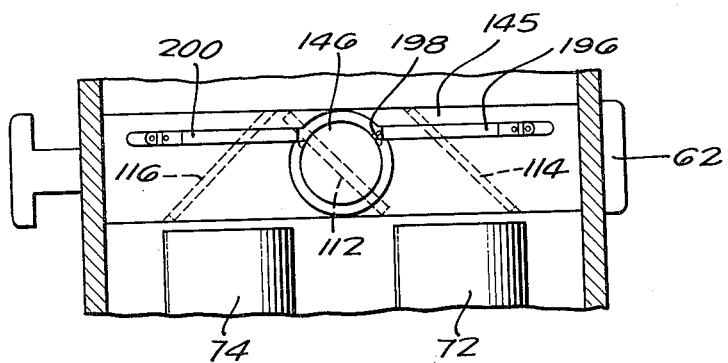
FIG. 7 is an enlarged broken sectional view of the comparator taken on the line 7—7 as shown in FIG. 6.
Figure 8:
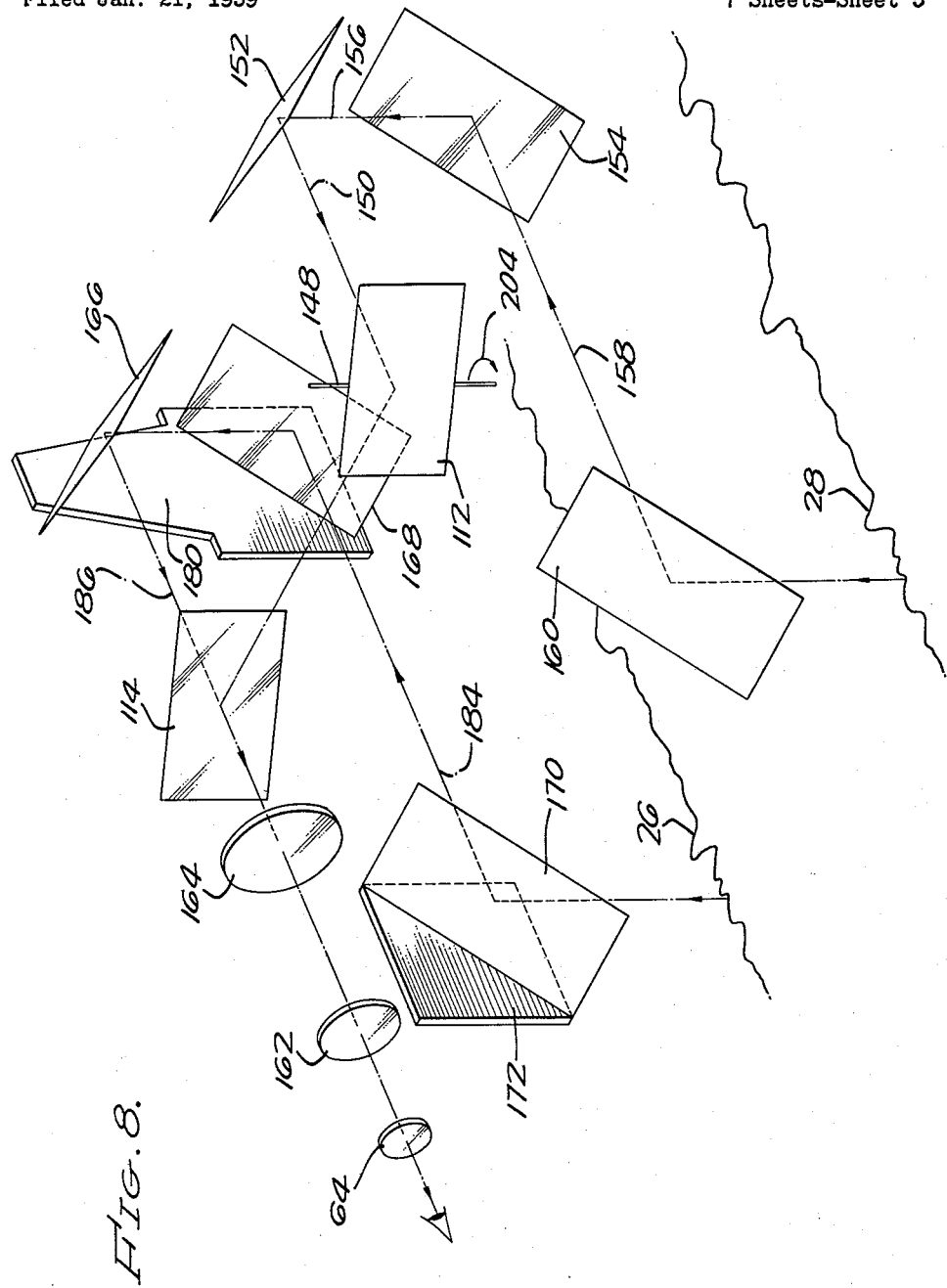
FIG. 8 is a perspective view only of some of the component parts of the comparator of the invention.

The manner in which the optical path is kept constant may be better understood in connection with the schematic and perspective view in FIG. 8. It is to be noted that if mirror 170 is moved to the left, compensation for the increase in the length of the optical path may be made by moving mirror 168 a distance equal to the distance that 170 is moved to the left, and in the same direction, to keep the distance from mirrors 168 and 170 equal along the line 184. However, this would mean that mirror 168 would not reflect an image of first curve 26 at the right position on mirror 166; thus, if mirror 168 is moved only ½ the distance mirror 170 is moved to the left, the other half of the increase in optical length may be taken care of by reduction in length of the line 186 from mirror 166 to beam splitter 114 if mirror 166 is moved toward beam splitter 114 exactly the same amount as mirror 168 is moved to the left toward mirror 170. In FIG. 6 a mirror 170 in the lefthand set and the corresponding mirror in the righthand set have been omitted to show cams 190 and 192 inside housing 54 which are fixed to knobs 76 and 78, respectively. Cam 190 operates lever arm 194 which operates shaft 196 to adjust or stop projection 198 on plate 146. Lower plate 146 is fixed to shaft 148 on which projection 198 is located. Shaft 196 acts as stop means when mirror 112 is in a position shown in FIG. 7. When mirror 112 is turned to the left approximately 90 degrees, a shaft 200 acts as stop means for projection 198. A follower arm 202 is provided to rest against cam 192 to operate shaft 200.

Operation of the comparator shown in FIG. 1 may be best explained in connection with the view taken in FIG. 8. Hand wheel 42 is rotated to the right as viewed in FIG. 1 until recording sheet 24 is located under comparator 20 at a desired position. Bar 62 is then pushed to the right as viewed in FIG. 2 and knob 76 is rotated until first and second curves 26 and 28 appear to come into lateral alignment. Knob 76 can be rotated by an operator with one hand and drum 80 with the other simultaneously if desired. Drum 80 will cause mirror 170 to move longitudinally along the first curve 26 as mirrors 166 and 168 carried by plate 180 are moved at half the speed in the same direction as mirror 170. Movement of bar 62 to the position shown in FIG. 1 will cause mirror 112 to be rotated to the position shown in FIG. 8. In this position, an image of second curve 28 will be reflected from mirror 160 to mirror 154, then to mirror 152 and then from mirror 112 to beam splitter 114, at which point it will be reflected through lenses 164, 162 and 64, respectively. An image of a portion of the first curve 26 will be reflected from mirror 170 to mirror 168 and from thence to mirror 166 and through beam splitter 114 and lenses 164, 162 and 64, respectively. It is to be noted that mirror 112 provides one additional reflecting surface more than is provided in the optical path of the reflection of images of first curve 26. For this reason, preferably beam splitter 114 has a ratio of transmissivity to reflectivity of approximately 55 to 45 although this is not critical.

When it is desired to compare second curve 28 with third curve 30, mirror 112 will be rotated in a direction as indicated by arrow 204 and an image of second curve 28 will be reflected toward a beam splitter 116, not shown in FIG. 8, and from thence through lenses corresponding to lenses 164, 162 in the righthand set of mirrors, and thence through lens 64. The movement of the righthand set of mirrors corresponding to mirrors 170, 168 and 166 is then performed in exactly the same manner as movement of mirrors 170, 168 and 166 themselves. Separately or together, knob 78 and drum 82 may be operated to match third curve 30 to second curve 28, mirror 112 being moved by pushing rod 62 to the left as viewed in FIG. 2. Due to the fact that the optical paths of both the movable left and righthand sets of mirrors are constant, it is unnecessary to readjust the focus of lefthand lenses including lenses 164, 162 and 64, and righthand lens system including lenses corresponding to lenses 164, 162 and 64. After drums 80 and 82 have been set to match curves 26 and 28, and 28 and 30, respectively, the displacement of curves 26 and 30 from curve 28 may be read directly from the indicia 100 and 102 on drums 80 and 82, respectively, as shown in FIG. 2. It can be appreciated that the righthand set of mirrors, lens system and beam splitter 116 corresponding to mirrors 170, 168, 166, beam splitter 114 and lenses 164, 162 and 64 would be located in the lower righthand corner of FIG. 8 were the drawing larger.

Figure 9:
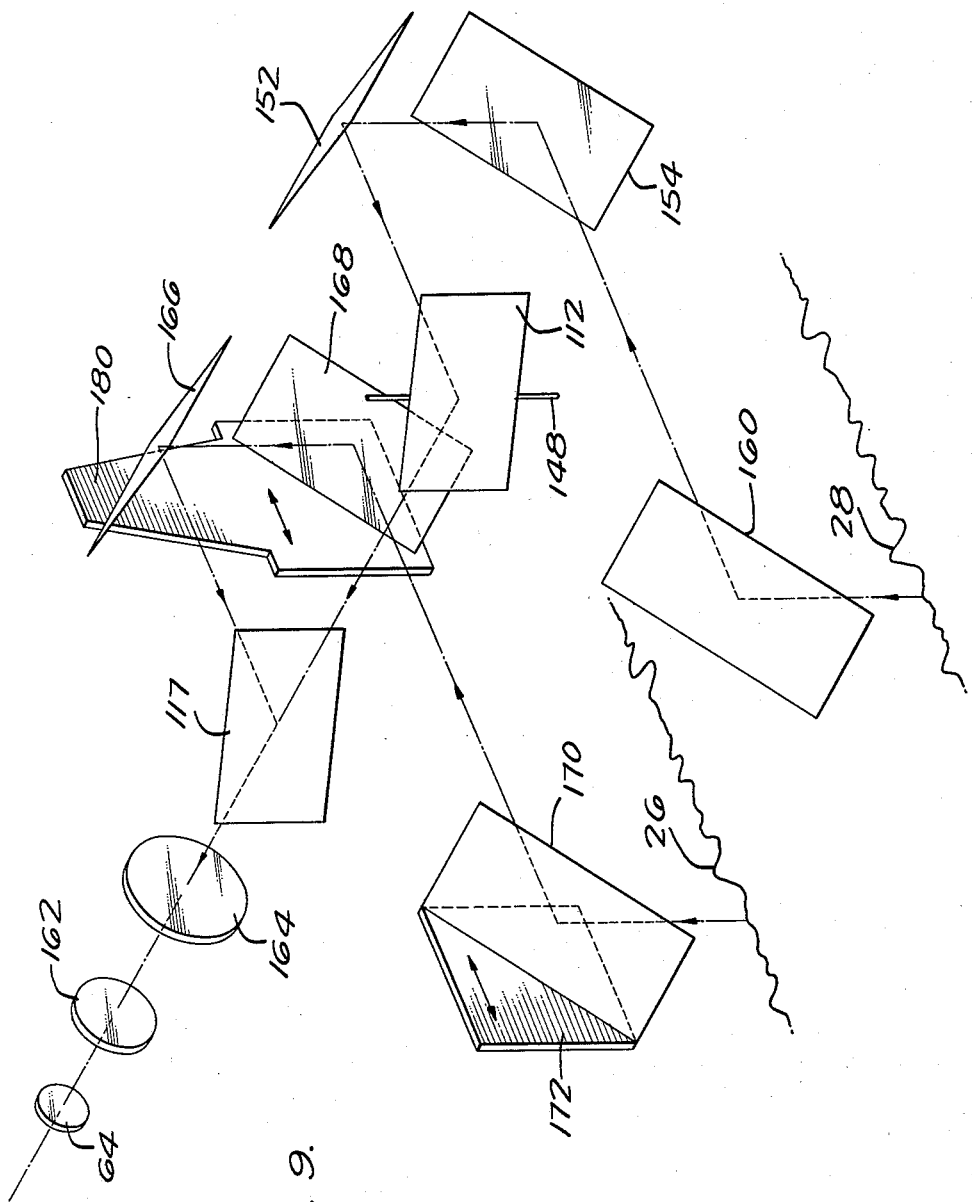
FIG. 9 is a perspective view of an alternative embodiment of the invention.

An alternative embodiment of the invention shown in FIG. 9 is identical to that shown in FIG. 8, with the exception that beam splitter 117 is located in a different position as are lenses 164, 162 and 64. It is to be noted that in this case beam splitter 117 transmits rather than reflects light reflected therethrough from mirror 112. In addition, beam splitter 117 reflects light reflected from mirror 166. In this case, beam splitter 117 should have a ratio of transmissivity to reflectivity of approximately 55 to 45, since mirror 112 produces additional light loss only in connection with the reflection of an image of second curve 28. It is to be noted that a preferred arrangement between the embodiments of FIGS. 8 and 9 is that shown in FIG. 8 because that system is more compact.

Figure 10:
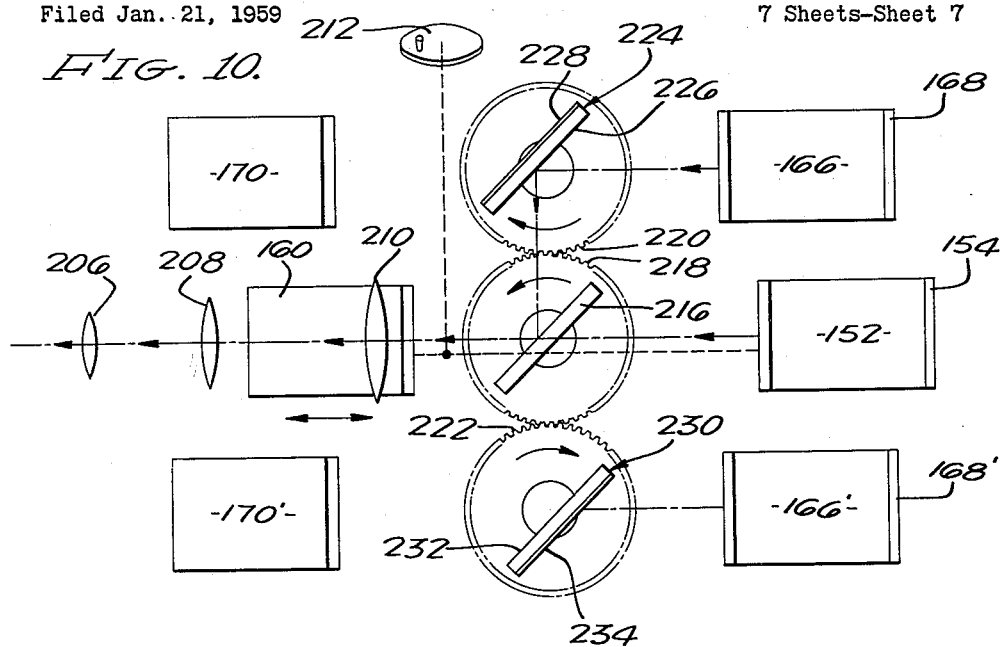
FIG. 10 is a plan view of another embodiment of the invention.

In FIG. 10, only a center set of lenses 206, 208 and 210 are required. FIG. 10 is a plan view of a system similar to that shown in FIG. 8. Thus, it is contemplated that mirrors identical to 170, 166 and 168 be used. A righthand set of mirrors is located at 170', 166', and 168'. Mirrors 170, 166 and 168, 170', 166' and 168' are maintained stationary and mirrors 160, 152 and 154 are moved longitudinally by hand wheel 212 which may perform exactly the same functions as drums 80 and 82 by moving mirrors 170 and 170' at half the speed of corresponding mirrors 166, 168 and 166', 168'. An advantage of the embodiment shown in FIG. 10 besides the use of single set of lenses 206, 208 and 210, is the use of a single beam splitter 216, which is fixed to a gear 218 that meshes both with a gear 220 and a gear 222. Gear 220 is fixed to a mirror 224 that has its reflecting surface indicated at 226 and a non-reflecting surface indicated at 228. Mirror 230 is fixed to gear 222 and has a reflecting surface indicated at 232 and a non-reflecting surface indicated at 234. If desired, it is not necessary for mirrors 224 and 230 to move exactly with beam splitter 216 and they may be made independently rotatable. Beam splitter 216 is rotatable to the left 90 degrees, and mirrors 224 and 230 are rotatable to the right 90 degrees.

In the position shown, first curve 26 under mirror 170 is being compared with second curve 28. When beam splitter 216 is rotated to the left 90 degrees, third curve 30 may be compared with second curve 28. It is to be noted that, in the position shown, the reflecting surface 232 of mirror 230 reflects from the forward portion of the housing in which the apparatus is employed. This will generally be dark and light reflection from mirror 230 will not interfere with the comparison of first and second curves 26 and 28 by reflection of light on the back of beam splitter 216. Still further, the discriminatory transmissivity to reflectivity characteristic of beam splitter 216 will discriminate against any light reflected from mirror 230 in the position shown in FIG. 10. Still further, light will tend to be reflected rearwardly or upwardly from beam splitter 216. It is to be noted that identical mirrors 116, 154 and 152 will generally be used to reflect an image of second curve 28 as before.

Figure 11:
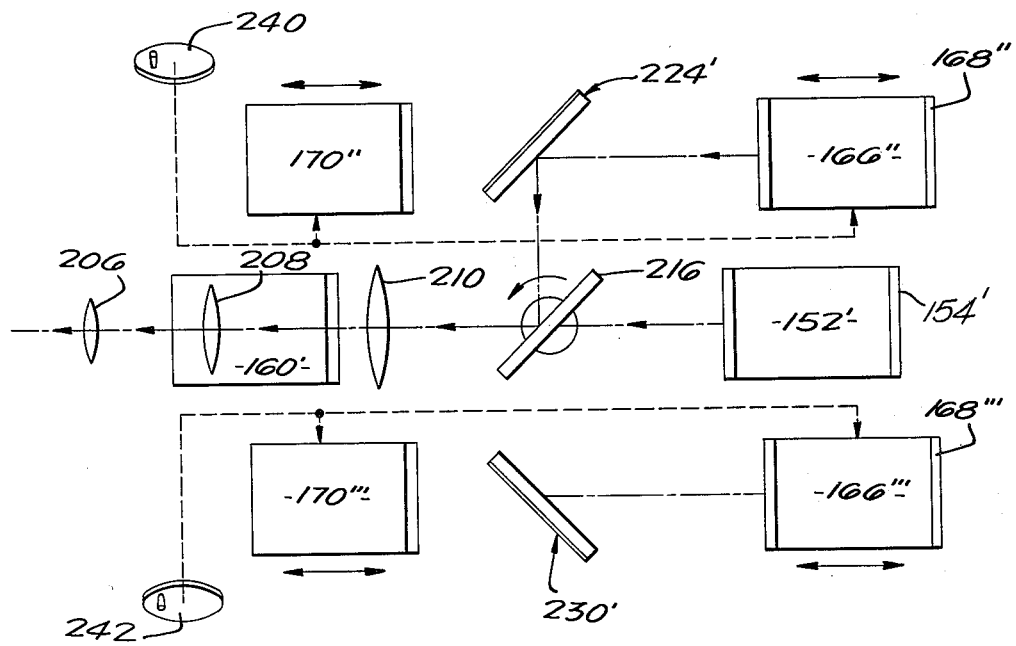
FIG. 11 is a plan view of still another embodiment of the invention.

Mirrors 224 and 230 may be fixed in position as indicated in FIG. 11 at 224' and 230'. Nothing is needed to prevent reflection of one of the images 26 and 30 when the other is being compared with an image of second curve 28 because light generally is reflected from one transversely through or rearwardly reflected from beam splitter 216.

It is to be noted that in FIG. 11, mirrors 170", 166", and 168", corresponding to mirrors 170, 166 and 168, and mirrors 170''', 166''', and 168''' corresponding to a righthand set of mirrors are moveable longitudinally with handwheels 240 and 242. A central set of mirrors are the only set of mirrors which are fixed. These mirrors are indicated at 160', 152' and 154'. The same beam splitter 216 and lenses 206, 208 and 210, may be employed in the embodiment of the invention shown in FIG. 11 as are employed in FIG. 10. The embodiment of FIG. 11 is preferred because second curve 28 can be considered a reference curve to eliminate further computations to determine dip angle and direction of inclination. Thus, the embodiment of the invention in FIG. 11 has two special advantages. In the first place, indicia which may be provided on hand wheels 240 and 242 will represent the distances from the corresponding first and third curves 26 and 30 from a single second curve 28. The second advantage is that only a single set of lenses 206, 208 and 210 need be used with a single beam splitter 216.

Many changes and modifications of the invention will, of course, suggest themselves to those skilled in the art. Still further, only a few specific embodiments of the invention have been shown and described herein. However, the invention is by no means to be limited to the embodiments illustrated or described, the true scope of the invention being defined only in the appended claims.

What is claimed is:

1. In optical apparatus for comparing portions of at least first and second curves at different positions along their lengths, said curves being displayed in a single predetermined plane, the combination comprising: support means; first and second sets of first, second and third reflecting means on said support means; said first means of said first set providing a first surface disposed at a 45 degree angle with respect to said predetermined plane to reflect a first image of a portion of said first curve in a first predetermined direction parallel to the lengths of said curves; said second means of said first set providing a second surface disposed at a 45 degree angle with respect to said predetermined plane to reflect a second image of said first image in a second predetermined direction perpendicular to and away from said predetermined plane; said third means of said first set providing a third surface disposed at an angle of 45 degrees with respect to said predetermined plane to reflect a third image of said second image in a third predetermined direction parallel to but opposite said first predetermined direction; a lens system on said support means; a beam splitter on said support means disposed in a position perpendicular to said predetermined plane at a 45 degree angle with respect to the lengths of said curves, said beam splitter being maintained in a position in a path of light reflected from said third means of said first set such that said light reflected from said third means of said first set impinging upon said beam splitter is permitted to enter said lens system; said first means of said second set providing a fourth surface in a plane parallel to that of said first surface to reflect a first image of at least a portion of said second curve in said first predetermined direction; said second means of said second set providing a fifth surface in a plane parallel to that of said second surface to reflect a second image of said first image of said second curve in said second predetermined direction; said third means of said second set providing a sixth surface in a plane parallel to that of said third surface to reflect a third image of said second image of said second curve in said third predetermined direction; and fourth means on said support means for providing a seventh surface in a plane parallel to that of said beam splitter to reflect a fourth image of said third image thereof of said second curve in a direction parallel to said predetermined plane and perpendicular to said third predetermined direction, said beam splitter also being maintained in a position in a path of light reflected from said fourth means such that said light reflected from said fourth means impinging upon said beam splitter is permitted to enter said lens system at least one of said first means of one of said sets being movable on said support means in said first predetermined direction, the optical distance from said first curve to said lens system being equal to that from said second curve to said lens system for a predetermined setting of said first means of said one set, said second and third means of said one set also being movable on said support means in the same direction as and with said first means of said one set and at one-half the speed thereof whereby the distance from a curve corresponding to said one set to said lens system is always maintained constant for any setting of said first means of said one set.

2. In optical apparatus for comparing portions of at least first and second curves at different positions along their lengths, said curves being displayed in a single predetermined plane, the combination comprising: support means; first and second sets of first, second and third reflecting means on said support means; said first means of said first set providing a first surface disposed at a 45 degree angle with respect to said predetermined plane to reflect a first image of a portion of said first curve in a first predetermined direction parallel to the lengths of said curves; said second means for said first set providing a second surface disposed at a 45 degree angle with respect to said predetermined plane to reflect a second image of said first image in a second predetermined direction perpendicular to and away from said predetermined plane; said third means of said first set providing a third surface disposed at an angle of 45 degrees with respect to said predetermined plane to reflect a third image of said second image in a third predetermined direction parallel to but opposite said first predetermined direction; a lens system on said support means; a beam splitter on said support means disposed in a position perpendicular to said predetermined plane at a 45 degree angle with respect to the lengths of said curves, said beam splitter being maintained in a position in a path of light reflected from said third means of said first set such that light reflected from said third means of said first set impinging upon said beam splitter is permitted to enter said lens system; said first means of said second set providing a fourth surface in a plane parallel to that of said first surface to reflect a first image of at least a portion of said second curve in said first predetermined direction; said second means of said second set providing a fifth surface in a plane parallel to that of said second surface to reflect a second image of said first image of said second curve in said second predetermined direction; said third means of said second set providing a sixth surface in a plane parallel to that of said third surface to reflect a third image of said second image of said second curve in said third predetermined direction; fourth means on said support means for providing a seventh surface in a plane parallel to that of said beam splitter to reflect a fourth image of said third image thereon of said second curve in a direction parallel to said predetermined plane and perpendicular to said third predetermined direction, said beam splitter also being maintained in a position in a path of light reflected from said fourth means such that said light reflected from said fourth means impinging upon said beam splitter is permitted to enter said lens system at least one of said first means of one of said sets being movable on said support means in said first predetermined direction, the optical distance from said first curve to said lens system being equal to that from said second curve to said lens system for a predetermined setting of said first means of said one set, said second and third means of said one set also being movable on said support means in the same direction as and with said first means of said one set and at one-half the speed thereof whereby the distance from a curve corresponding to said one set to said lens system is always maintained constant for any setting of said first means of said one set; and indicia on said support means and on said first means of said one set in visual correspondence to each other to provide means by which lengthwise displacement of said curves may be determined.

3. In optical apparatus for comparing portions of at least first and second curves at different positions along their lengths, said curves being displayed in a single predetermined plane, the combination comprising: support means; first and second sets of first, second and third reflecting means on said support means; said first means of said first set providing a first surface disposed at a 45 degree angle with respect to said predetermined plane to reflect a first image of a portion of said first curve in a first predetermined direction parallel to the lengths of said curves; said second means of said first set providing a second surface disposed at a 45 degree angle with respect to said predetermined plane to reflect a second image of said first image in a second predetermined direction perpendicular to and away from said predetermined plane; said third means of said first set providing a third surface disposed at an angle of 45 degrees with respect to said predetermined plane to reflect a third image of said second image in a third predetermined direction parallel to but opposite said first predetermined direction; a lens system on said support means having an optical axis in a plane parallel to said predetermined plane and extending in a direction perpendicular to said third predetermined direction; a beam splitter on said support means disposed in a position perpendicular to said predetermined plane at a 45 degree angle with respect to the lengths of said curves, said beam splitter being maintained in a position in a path of light reflected from said third means of said first set such that light reflected from said third means of said first set impinging upon said beam splitter is permitted to enter said lens system; said first means of said second set providing a fourth surface in a plane parallel to that of said first surface to reflect a first image of at least a portion of said second curve in said first predetermined direction; said second means of said second set providing a fifth surface in a plane parallel to that of said second surface to reflect a second image of said fourth image in said second predetermined direction; said third means of said second set providing a sixth surface in a plane parallel to that of said third surface to reflect a third image of said second image of said second curve in said third predetermined direction; and fourth means on said support means for providing a seventh surface in a plane parallel to that of said beam splitter to reflect a seventh image of said third image thereon of said second curve in a direction parallel to said predetermined plane and perpendicular to said third predetermined direction, said beam splitter being maintained in a position in a path of light reflected from said fourth means such that said light reflected from said fourth means impinging upon said beam splitter is permitted to enter said lens system at least one of said first means of one of said sets being movable on said support means in said first predetermined direction, the optical distance from said first curve to said lens system being equal to that from said second curve to said lens system for a predetermined setting of said first means of said one set, said second and third means of said one set also being movable on said support means in the same direction as and with said first means of said one set and at one-half the speed thereof whereby the distance from a curve corresponding to said one set to said lens system is always maintained constant for any setting of said first means of said one set.

4. In optical apparatus for comparing portions of at least first and second curves at different positions along their lengths, said curves being displayed in a single predetermined plane, the combination comprising: support means; first and second sets of first, second and third reflecting means on said support means; said first means of said first set providing a first surface disposed at a 45 degree angle with respect to said predetermined plane to reflect a first image of a portion of said first curve in a first predetermined direction parallel to the lengths of said curves; said second means of said first set providing a second surface disposed at a 45 degree angle with respect to said predetermined plane to reflect a second image of said first image in a second predetermined direction perpendicular to and away from said predetermined plane; said third means of said first set providing a third surface disposed at an angle of 45 degrees with respect to said predetermined plane to reflect a third image of said second image in a third predetermined direction parallel to but opposite said first predetermined direction; a lens system on said support means; a beam splitter on said support means disposed in a position perpendicular to said predetermined plane at a 45 degree angle with respect to the lengths of said curves, said beam splitter being maintained in a position in a path of light reflected from said third means of said first set such that light reflected from said third means of said first set impinging upon said beam splitter is permitted to enter said lens system; said first means of said second set providing a fourth surface in a plane parallel to that of said first surface to reflect a first image of at least a portion of said second curve in said first predetermined direction; said second means of said second set providing a fifth surface in a plane parallel to that of said second surface to reflect a second image of said fourth image in said second predetermined direction; said third means of said second set providing a sixth surface in a plane parallel to that of said third surface to reflect a third image of said second image of said curve in said third predetermined direction; fourth means on said support means for providing a seventh surface in a plane parallel to that of said beam splitter to reflect a seventh image of said third image thereon of said second curve in a direction parallel to said predetermined plane and perpendicular to said third predetermined direction, said beam splitter being maintained in a position in a path of light reflected from said fourth means such that said light reflected from said fourth means impinging upon said beam splitter is permitted to enter said lens system at least one of said first means of one of said sets being movable on said support means in said first predetermined direction, the optical distance from said first curve to said lens system being equal to that from said second curve to said lens system for a predetermined setting of said first means of said one set; a first rack fixed to said first means of said one set in a position to move in said first predetermined direction; a pinion rotatable on said second and third means of said one set meshed with said first rack; and a second rack parallel to said first rack fixed to said support means meshed with said pinion on the side thereof opposite said first rack.

5. In optical apparatus for comparing portions of at least first and second curves at different positions along their lengths, said curves being displayed in a single predetermined plane, the combination comprising: support means; first and second sets of first, second and third reflecting means on said support means; said first means of said first set providing a first surface disposed at a 45 degree angle with respect to said predetermined plane to reflect a first image of a portion of said first curve in a first predetermined direction parallel to the lengths of said curves; said second means of said first set providing a second surface disposed at a 45 degree angle with respect to said predetermined plane to reflect a second image of said first image in a second predetermined direction perpendicular to and away from said predetermined plane; said third means of said first set providing a third surface disposed at an angle of 45 degrees with respect to said predetermined plane to reflect a third image of said second image in a third predetermined direction parallel to but opposite said first predetermined direction; a lens system on said support means; a beam splitter fixed to said support means disposed in a plane perpendicular to said predetermined plane at a 45 degree angle with respect to the length of said curves to transmit light reflected from said third means of said first set to said lens system; said first means of said second set providing a fourth surface in a plane parallel to that of said first surface to reflect a first image of at least a portion of said second curve in said first predetermined direction; said second means of said second set providing a fifth surface in a plane parallel to that of said second surface to reflect a second image of said fourth image in said second predetermined direction; said third means of said second set providing a sixth surface in a plane parallel to that of said third surface to reflect a third image of said second image of said second curve in said third predetermined direction; and fourth means fixed to said support means for providing a seventh surface in a plane parallel to that of said beam splitter to reflect a seventh image of said third image thereon of said second curve in a direction parallel to said predetermined plane to be reflected therefrom towards said lens system, at least one of said first means of one of said sets being movable on said support means in said first predetermined direction, said beam splitter having a ratio of transmissivity to reflectivity approximately in the proportion 45 to 55, the optical distance from said first curve to said lens system being equal to that from said second curve to said lens system for a predetermined setting of said first means of one of said sets, said second and third means of said one set being movable with and at one-half the speed of said first means of said one set whereby the optical distance from the corresponding curve imaged in said first means of said one set to said lens system is also always maintained constant for any setting of said first means of said one set.

6. In optical apparatus for comparing portions of at least first and second curves at different positions along their lengths, said curves being displayed in a single predetermined plane, the combination comprising: support means; first means movable along the length of said curves on said support means for providing a first surface disposed at a 45 degree angle with respect to said predetermined plane to reflect a first image of a portion of said first curve in a first predetermined direction parallel to the lengths of said curves; second means movable in the same direction as and with said first means on said support means for providing a second surface parallel to said first surface to reflect a second image of said first image in a second predetermined direction perpendicular to and away from said predetermined plane; third means movable in the same direction as and with said second means at the same speed thereof on said support means for providing a third surface perpendicular to the plane of said second surface to reflect a third image of said second image in a third predetermined direction parallel to but opposite said first predetermined direction; a lens system fixed to said support means; a beam splitter fixed to said support means disposed in a plane perpendicular to said predetermined plane at a 45 degree angle with respect to the lengths of said curves, said beam splitter being maintained in a position in a path of light reflected from said third means of said first set such that light reflected from said third means of said first set impinging upon said beam splitter is permitted to enter said lens system; fourth means fixed to said support means for providing a fourth surface in a plane parallel to said first surface to reflect a first image of a portion of said second curve in said first predetermined direction; fifth means fixed to said support means for providing a fifth surface in a plane parallel to said second surface to reflect a second image of said second curve in said second predetermined direction; sixth means fixed to said support means for providing a sixth surface in a plane parallel to that of said third surface to reflect a third image of said second image of said second curve in said third predetermined direction; and seventh means fixed to said support means for providing a seventh surface in a plane parallel to that of said beam splitter to reflect a fourth image of said third image thereon of said second curve in a direction parallel to said predetermined plane and perpendicular to said third predetermined direction, said beam splitter being maintained in a position in a path of light reflected from said seventh means such that said light reflected from said seventh means impinging upon said beam splitter is permitted to enter said lens system, the optical distance from said first curve to said lens system being equal to that from said second curve to said lens system for a predetermined setting of said first means, said second means being movable at one-half the speed of said first means whereby the optical distance from said first curve to said lens system is always maintained constant for any setting of said first means.

7. In optical apparatus for comparing portions of at least first and second curves with a third curve at different positions along their lengths, said curves being displayed in a single predetermined plane, the combination comprising: support means; first means movable along the length of said curves on said support means for providing a first surface disposed at a 45 degree angle with respect to said predetermined plane to reflect a first image of a portion of said first curve in a first predetermined direction parallel to the lengths of said curves; second means movable in the same direction as and with said first means on said support means for providing a second surface parallel to said first surface to reflect a second image of said first image in a second predetermined direction perpendicular to and away from said predetermined plane; third means movable in the same direction as and with said second means at the same speed thereof on said support means for providing a third surface perpendicular to the plane of said second surface to reflect a third image of said second image in a third predetermined direction parallel to but opposite said first predetermined direction; a first lens system fixed to said support means; a first beam splitter fixed to said support means disposed in a plane perpendicular to said predetermined plane at a 45 degree angle with respect to the lengths of said curves, said beam splitter being maintained in a position in a path of light reflected from said third means such that light reflected from said third means impinging upon said first beam splitter is permitted to enter said first lens system said lens system; fourth means fixed to said support means for providing a fourth surface in a plane parallel to said first surface to reflect a first image of a portion of said second curve in said first predetermined direction; fifth means fixed to said support means for providing a fifth surface in a plane parallel to said second surface to reflect a second image of said fourth image in said second predetermined direction; sixth means fixed to said support means for providing a sixth surface in a plane parallel to that of said third surface to reflect a third image of said second image of said second curve in said third predetermined direction; seventh means movable along the length of said third curve on said support means for providing a seventh surface disposed at a 45 degree angle with respect to said predetermined plane to reflect a first image of at least a portion of said third curve in said first predetermined direction parallel to the lengths of said curves; eighth means movable in the same direction as and with said seventh means for providing an eighth surface disposed at a 45 degree angle with respect to said predetermined plane to reflect a second image of said first image of said third curve in said second predetermined direction perpendicular to and away from said predetermined plane; ninth means movable in the same direction as and with said eighth means at the same speed thereof on said support means for providing a ninth surface disposed at a 45 degree angle with respect to said predetermined plane to reflect a third image of said second image of said third curve in said third predetermined direction; a second lens system fixed to said support means; a second beam splitter fixed to said support means disposed in a plane substantially perpendicular to that of said first beam splitter, said second beam splitter being maintained in a position in a path of light reflected from said ninth means such that said light reflected from said ninth means impinging upon said second beam splitter is permitted to enter said second lens system, said fourth, fifth and sixth means being disposed between said first, second and third means, and said seventh, eighth and ninth means; tenth means rotatable on said support means about an axis substantially perpendicular to said predetermined plane either to a position for providing a tenth surface in a plane parallel to that of said first beam splitter to reflect a fourth image of said third image of said second curve toward said first beam splitter, or to a position parallel to that of said second beam splitter to reflect a fourth image of said third image of said second curve toward said second beam splitter, the optical distance from said first and second curves to said first lens system being equal to that from said second and third curves to said second lens system for a predetermined setting of said first and seventh means, said second means being movable at one-half the speed of said first means, said eighth means also being movable at one-half the speed of said seventh means whereby the optical distances from said first curve to said first lens system and from said second curve to said second lens system are always maintained constant for any setting of said first or seventh means.

8. In optical apparatus for comparing at least portions of first, second and third curves at different positions along their lengths, said curves being displayed in a single predetermined plane, the combination comprising: support means; first, second and third sets of first, second and third reflecting means on said support means; said first means of said first set providing a first surface disposed at a 45 degree angle with respect to said predetermined plane to reflect a first image of at least a portion of said first curve in a first predetermined direction parallel to the lengths of said curves; said second means of said first set providing a second surface parallel to said first surface to reflect a second image of said first image in a second predetermined direction perpendicular to and away from said predetermined plane; said third means of said first set providing a third surface in a plane perpendicular to that of said second surface to reflect a third image of said second image in a third predetermined direction parallel to but opposite said first predetermined direction; said first means of said second set providing a fourth surface parallel to said first surface to reflect a first image of at least a portion of said second curve in said first predetermined direction; said second means of said second set providing a fifth surface parallel to said second surface to reflect a second image of said first image of said second curve in said second predetermined direction; said third means of said second set providing a sixth surface parallel to said third surface to reflect a third image of said second image of said second curve in said third predetermined direction; said first means of said third set providing a seventh surface parallel to said first and fourth surfaces to reflect a first image of at least a portion of said third curve in said first predetermined direction; said second means of said third set providing an eighth surface parallel to said second and fifth surfaces to reflect a second image of said first image of said third curve in said second predetermined direction; said third means of said third set providing a ninth surface parallel to said third and sixth surfaces to reflect a third image of said second image of said third curve in said third predetermined direction; said first set being disposed between said second and third sets; fourth means on said support means for providing a tenth surface to reflect a fourth image of said third image of said second curve in a fourth predetermined direction parallel to said predetermined plane and perpendicular to said third predetermined direction; fifth means on said support means for providing an eleventh surface in a plane perpendicular to that of said tenth surface to reflect a fourth image of said third image of said third curve in a direction opposite said fourth predetermined direction; a beam splitter between said fourth and fifth means in a plane perpendicular to said predetermined plane to transmit light from said third means of said first set therethrough, said beam splitter being rotatable about an axis substantially perpendicular to said predetermined plane either to a position to reflect light from said fourth means in said third predetermined direction or, alternatively, to reflect light from said fifth means in said third predetermined direction; and a lens system to receive light transmitted through said beam splitter from said third means of said first set and to receive light reflected either from said fourth or from said fifth means, at least one of said first means of one of said sets being movable on said support means in said predetermined direction, the optical paths between said first and second curves to said lens system and from said first and third curves to said lens system being equal for a predetermined setting of said first means of said one set, the second means and the third means of said one set being movable with said first means and at one-half the speed thereof, whereby the distance from a curve corresponding to said one set to said lens system is always maintained constant for any setting of said first means of said one set.

References Cited in the file of this patent

UNITED STATES PATENTS

| | | |
|---|---|---|
| 2,549,669 | Cuny | Apr. 17, 1951 |
| 2,553,285 | Thomas | May 15, 1951 |
| 2,625,853 | Hayward | Jan. 20, 1953 |
| 2,754,719 | De Chambrier | July 17, 1956 |

UNITED STATES PATENT OFFICE

CERTIFICATE OF CORRECTION

Patent No. 3,055,261 September 25, 1962

Theodor H. Braun et al.

It is hereby certified that error appears in the above numbered patent requiring correction and that the said Letters Patent should read as corrected below.

Column 13, line 30, strike out "said lens system".

Signed and sealed this 19th day of February 1963.

(SEAL)
Attest:

ESTON G. JOHNSON
Attesting Officer

DAVID L. LADD
Commissioner of Patents